United States Patent
Redana et al.

(10) Patent No.: US 9,668,170 B2
(45) Date of Patent: May 30, 2017

(54) CONTROLLED LOAD BALANCING BETWEEN ACCESS NETWORKS WITH VARIOUS POLICIES FROM DIFFERENT SOURCES

(71) Applicant: NOKIA SOLUTIONS AND NETWORKS OY, Espoo (FI)

(72) Inventors: Simone Redana, Munich (DE); Jussi-Pekka Koskinen, Oulu (FI); Jarkko T. Koskela, Oulu (FI); Ilkka Keskitalo, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 290 days.

(21) Appl. No.: 14/377,956

(22) PCT Filed: Jun. 30, 2014

(86) PCT No.: PCT/EP2014/063802
§ 371 (c)(1),
(2) Date: Aug. 11, 2014

(87) PCT Pub. No.: WO2014/207253
PCT Pub. Date: Dec. 31, 2014

(65) Prior Publication Data
US 2016/0249253 A1 Aug. 25, 2016

Related U.S. Application Data

(60) Provisional application No. 61/840,836, filed on Jun. 28, 2013.

(51) Int. Cl.
*H04L 12/26* (2006.01)
*H04W 28/08* (2009.01)
(Continued)

(52) U.S. Cl.
CPC ....... *H04W 28/08* (2013.01); *H04W 28/0289* (2013.01); *H04W 36/22* (2013.01); *H04W 36/14* (2013.01); *H04W 48/18* (2013.01)

(58) Field of Classification Search
CPC ............. H04W 28/02; H04W 28/0205; H04W 28/0247; H04W 28/021; H04W 28/08;
(Continued)

(56) References Cited

U.S. PATENT DOCUMENTS

2008/0102815 A1* 5/2008 Sengupta ............... H04W 36/24
455/424
2010/0208698 A1* 8/2010 Lu ..................... H04W 36/0027
370/331
(Continued)

FOREIGN PATENT DOCUMENTS

EP 2 571 311 A1 3/2013
WO 2010/080966 A1 7/2010
(Continued)

OTHER PUBLICATIONS

"3rd Generation Partnership Project; Technical Specification Group Radio Access Network; Study on WLAN/3GPP Radio Interworking (Release 12)"; 3GPP TR 37.834 V0.3.0; 3GPP Draft; 3rd Generation Partnership Project (3GPP); Mobile Competence Centre; 650, Route des Lucioles; F-06921 Sophia-Antipolis Cedex; France; Jun. 2, 2013 (Jun. 2, 2013), XP050700326, Retrieved from the Internet: URL:http://www.3gpp.org/ftp/tsg_ran/WG2_RL2/TSGR2_82/Docs/ [retrieved on Jun. 2, 2013] p. 6, paragraphs 4 to p. 13.
(Continued)

*Primary Examiner* — Ian N Moore
*Assistant Examiner* — Phong La
(74) *Attorney, Agent, or Firm* — Squire Patton Boggs (US) LLP (57) ABSTRACT

Various communication systems may benefit from load balancing. For example, wireless communication systems may benefit from controlled load balancing between access networks with various policies from different sources. A method can include selecting a rule to apply to a user equipment with respect to selection of radio access between cellular radio access and non-cellular radio access. The method can also include sending a traffic steering command to the user equipment, wherein the command contains an indication of the rule.

21 Claims, 3 Drawing Sheets

| St | Procedure | Message Sequence | |
|---|---|---|---|
| | | UE - NW | Message |
| 1 | The NW indicates for the UE that WLAN should be used whenever available (1 = go / stay to WLAN) | <-- | Traffic steering command (1) |
| 2 | The UE is not in coverage area of any WiFi networks | | |
| 3 | The UE moves to coverage area of SSID_1 and starts using it. | | |
| 4 | The NW indicates for the UE that Cellular should be used whenever available (0 = don't go / stay to WLAN) | <-- | Traffic steering command (0) |
| 5 | The UE stops using WLAN and the UE starts using cellular network i.e. by transferring / receiving data via default bearer. | | |

(51) Int. Cl.
*H04W 36/22* (2009.01)
*H04W 28/02* (2009.01)
*H04W 36/14* (2009.01)
*H04W 48/18* (2009.01)

(58) Field of Classification Search
CPC ......... H04W 28/0252; H04W 28/0257; H04W 28/0263; H04W 28/0268; H04W 28/0273
See application file for complete search history.

(56) References Cited

U.S. PATENT DOCUMENTS

| | | | |
|---|---|---|---|
| 2010/0302958 A1 | 12/2010 | Wietfeldt et al. | |
| 2011/0065435 A1* | 3/2011 | Pancorbo Marcos | H04W 76/041 455/436 |
| 2015/0003417 A1* | 1/2015 | Akiyoshi | H04W 48/18 370/331 |
| 2015/0105076 A1* | 4/2015 | Gupta | H04W 40/244 455/435.3 |
| 2015/0117406 A1* | 4/2015 | Kim | H04W 36/0022 370/331 |
| 2015/0139186 A1* | 5/2015 | Kim | H04W 48/14 370/331 |
| 2016/0066245 A1* | 3/2016 | Vikberg | H04W 36/14 370/331 |

FOREIGN PATENT DOCUMENTS

| | | |
|---|---|---|
| WO | 20111097321 A2 | 8/2011 |
| WO | 2012/142437 A1 | 10/2012 |

OTHER PUBLICATIONS

International Search Report application No. PCT/EP2014/063802 Oct. 27, 2014.

\* cited by examiner

| St | Procedure | Message Sequence | |
|---|---|---|---|
| | | UE – NW | Message |
| 1 | The NW indicates for the UE that WLAN should be used whenever available (1 = go / stay to WLAN) | <-- | Traffic steering command (1) |
| 2 | The UE is not in coverage area of any WiFI networks | | |
| 3 | The UE moves to coverage area of SSID_1 and starts using it. | | |
| 4 | The NW indicates for the UE that Cellular should be used whenever available (0 = don't go / stay to WLAN) | <-- | Traffic steering command (0) |
| 5 | The UE stops using WLAN and the UE starts using cellular network i.e. by transferring / receiving data via default bearer. | | |

CONTROLLED LOAD BALANCING BETWEEN ACCESS NETWORKS WITH VARIOUS POLICIES FROM DIFFERENT SOURCES

CROSS-REFERENCE TO RELATED APPLICATIONS

This application is a U.S. National Stage of PCT/EP2014/063802, filed Jun. 30, 2014, which is related to and claims the benefit and priority of U.S. Provisional Patent Application No. 61/840,836, filed Jun. 28, 2013, the entirety of which applications are hereby incorporated herein by reference.

BACKGROUND

Field

Various communication systems may benefit from load balancing. For example, wireless communication systems may benefit from controlled load balancing between access networks with various policies from different sources.

Description of the Related Art

Wireless local area network (WLAN)/third generation partnership project (3GPP) radio interworking may aim to provide benefits for load balancing between the 3GPP and non-3GPP access networks. Operator control may be an assumption that will enable more efficient utilization of operator managed WLAN networks for data offloading from cellular access. Also, when connected to WLAN, there ought to be means to return to cellular connection if the service quality is not satisfactory over the WLAN.

RAN2 may specify a bi-directional offloading solution, including offloading to and/or from WLAN access—especially the interactions between ANDSF/HotSpot 2.0 (HS2.0)—but there is no conventional way to provide these features.

SUMMARY

According to a first embodiment, a method can include selecting a rule to apply to a user equipment with respect to selection of radio access between cellular radio access and non-cellular radio access. The method can also include sending a traffic steering command to the user equipment, wherein the command contains an indication of the rule.

In a variant, the method can further include reevaluating which rule to apply. Moreover, the method can include applying a second rule by sending a second traffic steering command based on the reevaluating.

In a variant, the rule and the second rule can each include any rule or combination of rules selected from rules 0-16.

In a variant, the sending the traffic steering command may include sending a dedicated message or a broadcast message.

In a variant, the cellular radio access can include UTRAN or E-UTRAN.

In a variant, the non-cellular radio access can include WLAN.

In a variant, the user equipment may not be using ANDSF MO.

According to a second embodiment, a method can include receiving a traffic steering command to a user equipment, wherein the command contains an indication of a rule to apply with respect to selection of radio access between cellular radio access and non-cellular radio access. The method can also include selecting between cellular radio access and non-cellular radio access based on the rule.

In a variant, the method can also include receiving a second traffic steering command including an indication of a second rule. The method can further include reselecting between the cellular radio access and the non-cellular radio access based on the second rule.

In a variant, the rule and the second rule can each include any rule or combination of rules selected from rules 0-16.

In a variant, the user equipment may not be using ANDSF MO.

According to a third embodiment, an apparatus can include at least one processor and at least one memory including computer program code. The at least one memory and the computer program code can be configured to, with the at least one processor, cause the apparatus at least to select a rule to apply to a user equipment with respect to selection of radio access between cellular radio access and non-cellular radio access. The at least one memory and the computer program code can also be configured to, with the at least one processor, cause the apparatus at least to send a traffic steering command to the user equipment, wherein the command contains an indication of the rule.

In a variant, the at least one memory and the computer program code can also be configured to, with the at least one processor, cause the apparatus at least to reevaluate which rule to apply. Moreover, the at least one memory and the computer program code can be configured to, with the at least one processor, cause the apparatus at least to apply a second rule by sending a second traffic steering command based on the reevaluating.

In a variant, the rule and the second rule can each include any rule or combination of rules selected from rules 0-16.

In a variant, the at least one memory and the computer program code can be configured to, with the at least one processor, cause the apparatus at least to send the traffic steering command by sending a dedicated message or a broadcast message.

In a variant, the cellular radio access can include UTRAN or E-UTRAN.

In a variant, the non-cellular radio access can include WLAN.

In a variant, the user equipment may not be using ANDSF MO.

According to a fourth embodiment, an apparatus can include at least one processor and at least one memory including computer program code. The at least one memory and the computer program code can be configured to, with the at least one processor, cause the apparatus at least to receive a traffic steering command to a user equipment, wherein the command contains an indication of a rule to apply with respect to selection of radio access between cellular radio access and non-cellular radio access. The at least one memory and the computer program code can also be configured to, with the at least one processor, cause the apparatus at least to select between cellular radio access and non-cellular radio access based on the rule.

In a variant, the at least one memory and the computer program code can also be configured to, with the at least one processor, cause the apparatus at least to receive a second traffic steering command including an indication of a second rule. The at least one memory and the computer program code can further be configured to, with the at least one processor, cause the apparatus at least to reselect between the cellular radio access and the non-cellular radio access based on the second rule.

In a variant, the rule and the second rule can each include any rule or combination of rules selected from rules 0-16.

In a variant, the user equipment may not be using ANDSF MO.

According to a fifth embodiment, an apparatus can include means for selecting a rule to apply to a user equipment with respect to selection of radio access between cellular radio access and non-cellular radio access. The apparatus can also include means for sending a traffic steering command to the user equipment, wherein the command contains an indication of the rule.

In a variant, the apparatus can further include means for reevaluating which rule to apply. Moreover, the apparatus can include means for applying a second rule by sending a second traffic steering command based on the reevaluating.

In a variant, the rule and the second rule can each include any rule or combination of rules selected from rules 0-16.

In a variant, the sending the traffic steering command may include sending a dedicated message or a broadcast message.

In a variant, the cellular radio access can include UTRAN or E-UTRAN.

In a variant, the non-cellular radio access can include WLAN.

In a variant, the user equipment may not be using ANDSF MO.

According to a sixth embodiment, an apparatus can include means for receiving a traffic steering command to a user equipment, wherein the command contains an indication of a rule to apply with respect to selection of radio access between cellular radio access and non-cellular radio access. The apparatus can also include means for selecting between cellular radio access and non-cellular radio access based on the rule.

In a variant, the apparatus can also include means for receiving a second traffic steering command including an indication of a second rule. The apparatus can further include means for reselecting between the cellular radio access and the non-cellular radio access based on the second rule.

In a variant, the rule and the second rule can each include any rule or combination of rules selected from rules 0-16.

In a variant, the user equipment may not be using ANDSF MO.

According to seventh and eighth embodiments, a computer program product can respectively encode instructions for performing methods according to the first embodiment and second embodiment, in all their variations.

According to ninth and tenth embodiments, a non-transitory computer readable medium can be encoded with instructions that, when executed in hardware, perform the methods according to the first embodiment and second embodiment, in all their variations.

According to an eleventh embodiment, a system may include an apparatus according to the fifth embodiment and an apparatus according to the sixth embodiment in communication with one another.

BRIEF DESCRIPTION OF THE DRAWINGS

For proper understanding of the invention, reference should be made to the accompanying drawings, wherein.

DETAILED DESCRIPTION

Certain embodiments may provide a possibility to pass information from a base station, such as an evolved node B (eNB) to a user equipment (UE) to allow the UE to start traffic offloading to in a dynamic way that is currently not possible using existing access network discovery and selection function (ANDSF) MO.

Moreover, certain embodiments may use more than one bit to inform the UE about when to offload. Thus, certain embodiments may be able to provide a significant amount of detailed information. Moreover, certain embodiments may, therefore, permit fine tuning of offloading actions.

Certain embodiments provide a new signaling from network to the UE which would be able to dynamically control whether the UE should use local access network or cellular network or both at the same time. This signaling may be dedicated or broadcast. The local access network may, for example, be a wireless local area network (WLAN). The cellular network may be, for example, a universal terrestrial radio access network (UTRAN) or evolved UTRAN (E-UTRAN).

The signaling can include at least some of the following information. For example, there can be service set identification (SSID) lists for which SSID the rules are applicable. The SSID can be used in multiple, possibly overlapping base station subsystems (BSSs). In addition to, or instead of the SSID, other WLAN identifiers or other relevant WLAN access point (AP) identifiers can be used. The other identifiers can include basic service set identifier (BSSID), homogeneous extended service set identifier (HESSID), or a domain name list. For an infrastructure BSS, the BSSID can be the medium access control (MAC) address of the wireless access point. Similarly, HESSID can refer to a MAC address whose value is configured by the hotspot operator with the same value as the BSSID of one of the APs in the network. Moreover, all APs in the wireless network can be configured with the same HESSID value. A domain name list element can provide a list of one or more domain names of the entity operating the WLAN access network.

Optionally there may be many lists. For example, a first list may be for an operator's own Wi-Fi networks (NWs), a second list may be for partner Wi-Fi NWs, and a third list may be for something else.

The signal can also identify a rule. The rule can be selected as any one of the items from the following list, or any combination of the following rules. Other rules are also permitted. Moreover, there can be other access network selection criteria, for example based on signal power and/or quality measurements or the like, on top of this identified information.

A number identification is provided with each of the following rules, but this number is for the purpose of illustration. Other numberings are permitted. For example, 0 may correspond to a rule not go to or stay with WLAN. Likewise, 1 may correspond to a rule to go to or stay with WLAN. Furthermore, 2 may correspond to a rule to go to or stay with WLAN only if ANDSF and/or other policies say so. The other policies may include, for example, HS2.0, user settings, preconfigured policies, or the like.

There may also be further rules. Rule 3 can instruct to act according to ANDSF and/or other policies say so. Thus, following Rule 3 the UE may start using its default or typical operation. Likewise, rule 4 can instruct to go to or stay with cellular only if ANDSF and/or other policies say so. As above, the other policies with respect to rules 3 and 4 may include, for example, HS2.0, user settings, preconfigured policies, or the like.

Rule 5 can instruct to go to or stay with cellular. By contrast, rule 6 can instruct not to go to or stay with cellular.

Rule 7 can instruct to use best effort or default bearer traffic to WLAN. Additionally, there may be an explicit indication or another codepoint which indicates which bearers are targeted. Similarly, Rule 8 can instruct to use best effort or default bearer traffic to cellular. Again, there may be explicit indication or another codepoint which indicates which bearers are targeted.

By contrast, rule 9 can instruct use of a non-best effort or dedicated bearer traffic to WLAN. Similarly, rule 10 can indicate use of a non-best effort or dedicated bearer traffic to cellular. With respect to rules 9 and 10, as with rules 7 and 8 there may be an explicit indication or another codepoint that indicates which bearers are targeted.

Rule 11 can instruct to act according to ANDSF, and/or other policies, if the WLAN supports authentication and access to operator network and/or services, such as HS2.0 support. The WLAN can either be an operator's own, a partner's, or another WLAN.

Rule 12 can instruct to go to WLAN according to available policies only if the SSID matches with the list of applicable WLAN and the WLAN supports authentication and access to operator network/services such as by HS2.0 support.

Rule 13 can instruct to go to or stay with an operator WLAN if SSIDs separately informed. Likewise, rule 14, can instruct to go to or stay with a partner WLAN if SSIDs separately informed. By contrast, rule 15 can instruct not to go to or stay with an operator WLAN if SSIDs separately informed and rule 16 can instruct not to go to or stay with a partner WLAN if SSIDs separately informed.

As mentioned above, any combination of the preceding rules can be combined together. Similarly, additional rules can be provided.

The following non-limiting example describes how certain embodiments may be utilized by a user equipment (UE) and by a network, although many other alternatives are permitted. In this example, a precondition is that UE is in RRC_CONNECTED in a cellular network, that the UE is not in coverage of any WiFI network, and that only the default bearer is configured. The user may be, for example, web browsing.

The following SSID lists can be configured for the UE via the cellular network. A first list can be the operator's own Wi-Fi NWs: SSID_1 and SSID_2. A second list can be partner Wi-Fi NWs: SSID_3 and SSID_4.

ANDSF MO can be available in the UE with the following priority: first cellular, second SSID 1, and third SSID 2.

Figure 1:
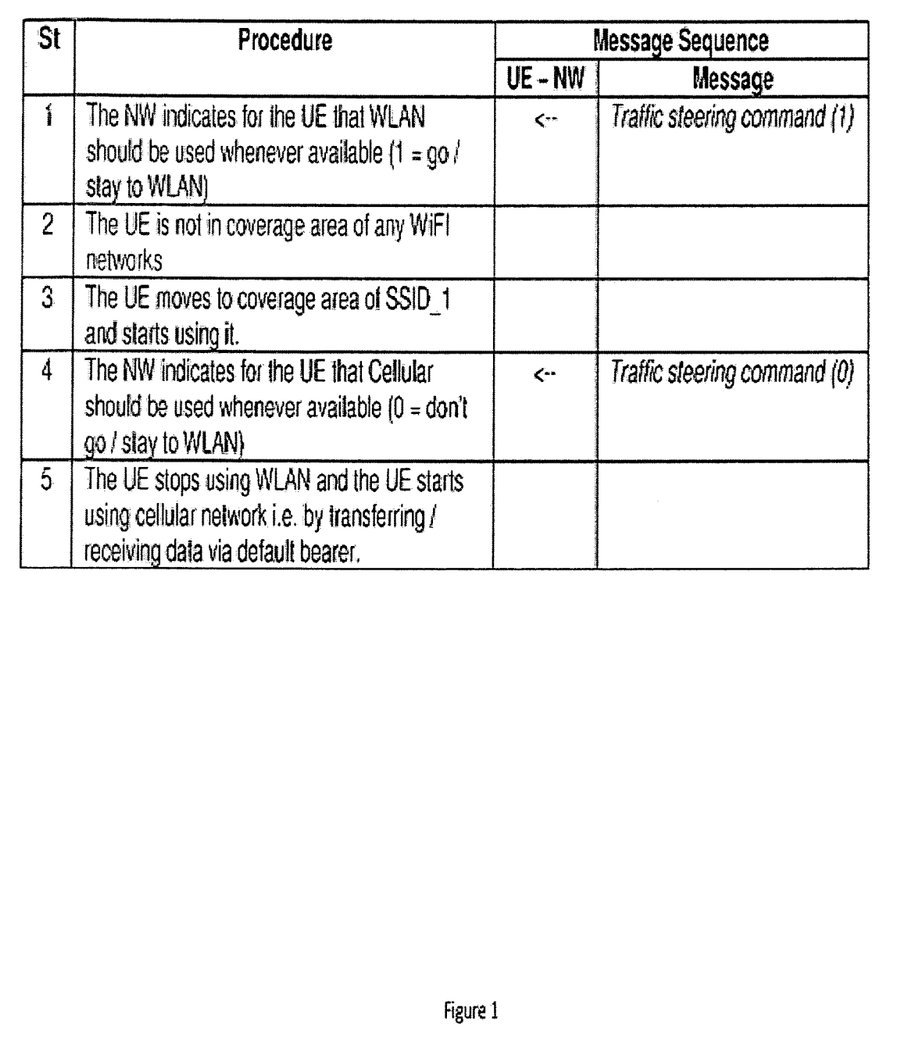
FIG. 1 illustrates a signal flow according to certain embodiments.

FIG. 1 illustrates a method according to certain embodiments. In the example shown in FIG. 1, the UE may not have ANDSF MO. As shown in FIG. 1, at step (St) 1, the network (NW) can indicate that, for the UE, WLAN should be used whenever available. This may correspond to rule 1, go to/stay with WLAN, as mentioned above. This may be implemented as a traffic steering command, including an indication of rule 1, from the network to the user equipment. This signaling can happen with dedicated and/or broadcast signaling. This signaling may be triggered due to a need for load balancing between local and cellular networks, for example because cellular is temporarily overloaded.

At step 2, the user equipment may not be in a coverage area of any WiFi networks. At step 3, however, the UE may move into coverage area of SSID_1 and may start using it. Although the UE starts using SSID_1, the NW can decide to keep the UE in RRC_CONNECTED state in cellular, although there is no active traffic on-going.

At step 4, the network can send another traffic steering command, this time including an indication of rule 0. Thus, the network can indicate that, for the UE, cellular should be used whenever available. Rule 0 can correspond to an instruction not to go to or stay with WLAN. This signaling could happen with dedicated and/or broadcast signaling. This command may be signaled because, for example, an overload situation in the cellular network is getting better.

Finally, at step 5, the UE can stop using WLAN and the UE can start using the cellular network. This may be accomplished by, for example, transferring and/or receiving data via a default bearer.

Certain embodiments may be network based implementations. For example, either a base station, such as an eNB, or a core network element may send or trigger the traffic steering command. Moreover, in certain embodiments the information exchange between eNBs may be enhanced to support DRX information sharing. Furthermore, in certain embodiments, RLF reporting is used. This may be incorporated into an RRC specification.

Certain embodiments may have various advantages. For example, certain embodiments may provide for reliable load balancing between cellular and WLAN access, allowing controlled steering of traffic not only from cellular to non-cellular, but also from non-cellular to cellular access.

There may be no seamless handover requirement with radio measurement reporting across systems. Thus, there may be no need for joint RRM operation. Too tight radio interworking may be difficult due to system complexity to achieve even small benefits for radio operation and user experience. Certain embodiments, however, may still provide a way to implement smooth transition between cellular and local access.

Figure 2:
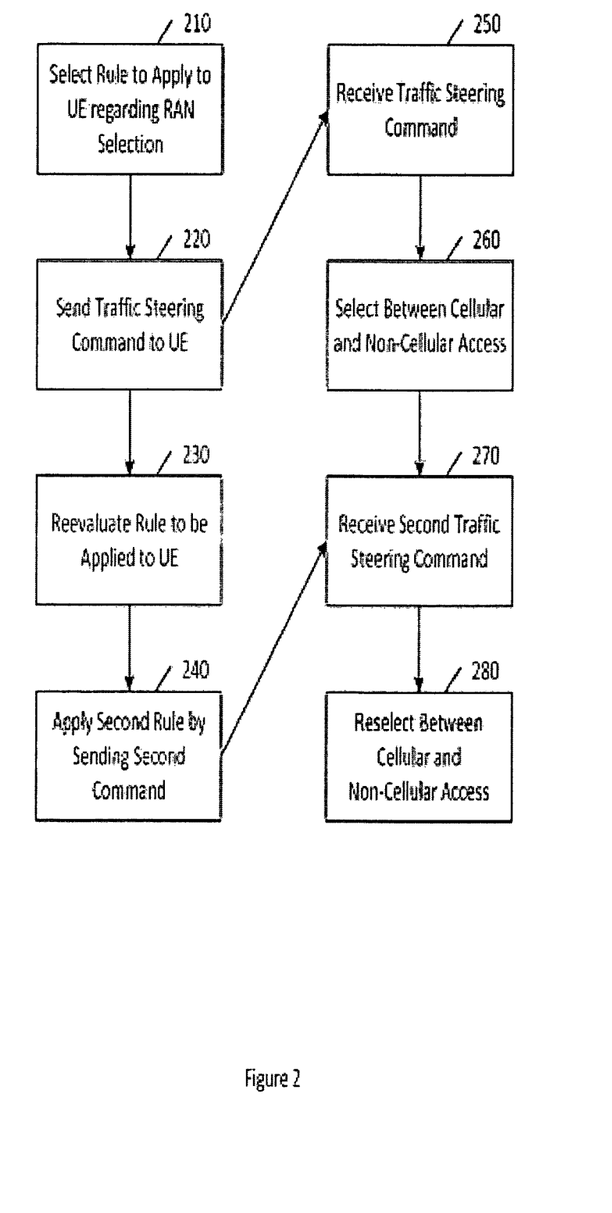
FIG. 2 illustrates a method according to certain embodiments.

FIG. 2 illustrates a method according to certain embodiments. As shown in FIG. 2, a method can include, at 210, selecting a rule to apply to a user equipment with respect to selection of radio access between cellular radio access and non-cellular radio access. This rule can be selected based on various criteria, such as current network loading. The cellular radio access can include UTRAN or E-UTRAN. The non-cellular radio access can include WLAN.

The method can also include, at 220, sending a traffic steering command to the user equipment, wherein the command contains an indication of the rule. The sending the traffic steering command may include sending a dedicated message or a broadcast message.

The method can further, at 230, include reevaluating which rule to apply. Moreover, the method can include, at 240, applying a second rule by sending a second traffic steering command based on the reevaluating.

The rule and the second rule can each include any rule or combination of rules selected from rules 0-16, discussed above.

The user equipment may not be using ANDSF MO.

The method may additionally include, at 250, receiving a traffic steering command to a user equipment, wherein the command contains an indication of a rule to apply with respect to selection of radio access between cellular radio access and non-cellular radio access. The method may also include, at 260, selecting between cellular radio access and non-cellular radio access based on the rule.

The method may further include, at 270, receiving a second traffic steering command including an indication of a second rule. Additionally, the method may include, at 280, reselecting between the cellular radio access and the non-cellular radio access based on the second rule.

The user equipment may not be using ANDSF MO.

Figure 3:
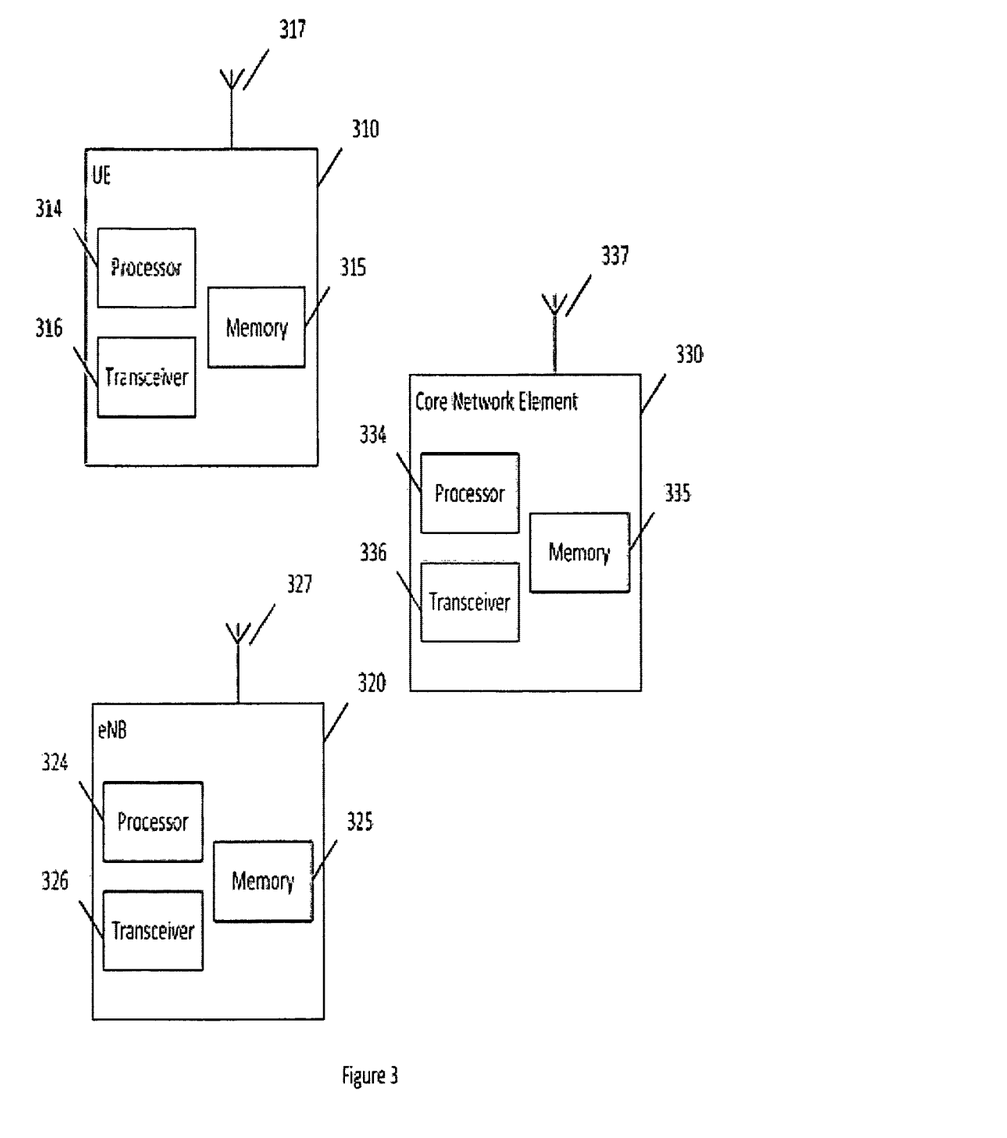
FIG. 3 illustrates a system according to certain embodiments.

FIG. 3 illustrates a system according to certain embodiments of the invention. In one embodiment, a system may include multiple devices, such as, for example, at least one UE 310, at least one eNB 320 or other base station or access point, and at least one core network element 330. In certain systems, only UE 310 and eNB 320 may be present, and in other systems UE 310, eNB 320, and a plurality of other user equipment may be present. Other configurations are also possible.

Each of these devices may include at least one processor, respectively indicated as 314, 324, and 334. At least one memory can be provided in each device, and indicated as 315, 325, and 335, respectively. The memory may include computer program instructions or computer code contained therein. The processors 314, 324, and 334 and memories 315, 325, and 335 can be configured to provide means corresponding to the various blocks of FIG. 2.

As shown in FIG. 3, transceivers 316, 326, and 336 can be provided, and each device may also include an antenna, respectively illustrated as 317, 327, and 337. Other configurations of these devices, for example, may be provided. For example, core network element 330 may be configured for wired communication, rather than wireless communication, and in such a case antenna 337 would illustrate any form of communication hardware, without requiring a conventional antenna.

Transceivers 316, 326, and 336 can each, independently, be a transmitter, a receiver, or both a transmitter and a receiver, or a unit or device that is configured both for transmission and reception.

Processors 314, 324, and 334 can be embodied by any computational or data processing device, such as a central processing unit (CPU), application specific integrated circuit (ASIC), or comparable device. The processors can be implemented as a single controller, or a plurality of controllers or processors.

Memories 315, 325, and 335 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 310, eNB 320, and core network element 330, to perform any of the processes described above (see, for example, FIGS. 1 and 2). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 3 illustrates a system including a UE, eNB, and core network element, embodiments of the invention may be applicable to other configurations, and configurations involving additional elements. Not shown, the UE 310 may be in communication with a wireless local area network.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method for load balancing, comprising:
sending a traffic steering command to a user equipment, wherein the traffic steering command contains an indication of a first rule to be applied by the user equipment with respect to selecting radio access between cellular radio access and non-cellular radio access;
evaluating which rule to apply; and
sending a second traffic steering command to the user equipment based on the evaluating,
wherein the second traffic steering command contains an indication of a second rule to be applied by the user equipment with respect to selecting radio access between cellular radio access and non-cellular radio access,
wherein the second rule instructs the user equipment to go or to stay with cellular radio access, or instruct the user equipment to go to or stay with non-cellular radio access,
wherein the non-cellular radio access comprises wireless local area network (WLAN) access networks,
wherein the second traffic steering command further includes a plurality of lists that list the WLAN access networks based on at least one of a service set identifier (SSID), a basic service set identifier (BSSID), and a homogeneous extended service set identifier (HESSID) for which the rules are applicable,
wherein the plurality of lists includes a first list for an operator's own WLAN access networks, and a second list for a partner's WLAN access networks, and
wherein the user equipment is not using access network discovery and selection function (ANDSF MO) before receiving the first rule.

2. The method for load balancing of claim 1, wherein the sending the second traffic steering command comprises sending a dedicated message or a broadcast message.

3. The method for load balancing of claim 1, wherein the cellular radio access comprises UTRAN or E-UTRAN.

4. The method for load balancing of claim 1, wherein the non-cellular radio access comprises WLAN.

5. The method for load balancing of claim 1, wherein the second rule further indicates one or more bearers for which the user equipment is to apply non-cellular access.

6. The method for load balancing of claim 5, wherein the one or more bearers comprises a bearer for best effort traffic.

7. The method for load balancing of claim 1, wherein the second rule further indicates a domain name list that lists one or more domain names of an entity operating a WLAN access network.

8. A method for load balancing, comprising:
receiving a traffic steering command by a user equipment, wherein the traffic steering command contains an indication of a first rule to apply with respect to selection of radio access between cellular radio access and non-cellular radio access;

selecting between cellular radio access and non-cellular radio access based on the first rule; and receiving a second traffic steering command including an indication of a second rule to be applied by the user equipment with respect to selecting radio access between cellular radio access and non-cellular radio access, wherein the second rule instructs the user equipment to go or to stay with cellular radio access, or instruct the user equipment to go to or stay with non-cellular radio access, wherein the non-cellular radio access comprises wireless local area network (WLAN) access networks, wherein the second traffic steering command further includes a plurality of lists that list the WLAN access networks based on at least one of a service set identifier (SSID), a basic service set identifier (BSSID), and a homogeneous extended service set identifier (HESSID) for which the rules are applicable, wherein the plurality of lists includes a first list for an operator's own WLAN access networks, and a second list for a partner's WLAN access networks, and wherein the user equipment is not using access network discovery and selection function (ANDSF MO) before receiving the first rule.

9. The method for load balancing of claim 8, wherein the second rule further indicates one or more bearers for which the user equipment is to apply non-cellular access.

10. The method for load balancing of claim 9, wherein the one or more bearers comprises a bearer for best effort traffic.

11. The method for load balancing of claim 8, wherein the second rule further indicates a domain name list that lists one or more domain names of an entity operating a WLAN access network.

12. An apparatus for load balancing, comprising:
at least one processor; and
at least one memory including computer program code,
wherein the at least one memory and the computer program code are configured to, with the at least one processor, cause the apparatus at least to
send a traffic steering command to a user equipment, wherein the traffic steering command contains an indication of a first rule to be applied by the user equipment with respect to selecting radio access between cellular radio access and non-cellular radio access;
evaluate which rule to apply; and
send a second traffic steering command to the user equipment based on the evaluating,
wherein the second traffic steering command contains an indication of a second rule to be applied by the user equipment with respect to selecting radio access between cellular radio access and non-cellular radio access
wherein the second rule instructs the user equipment to go or to stay with cellular radio access, or instruct the user equipment to go to or stay with non-cellular radio access,
wherein the non-cellular radio access comprises wireless local area network (WLAN) access networks,
wherein the second traffic steering command further includes a plurality of lists that list the WLAN access networks based on at least one of a service set identifier (SSID), a basic service set identifier (BSSID), and a homogeneous extended service set identifier (HESSID) for which the rules are applicable,
wherein the plurality of lists includes a first list for an operator's own WLAN access networks, and a second list for a partner's WLAN access networks, and
wherein the user equipment is not configured to use access network discovery and selection function (ANDSF MO) before receiving the first rule.

13. The apparatus for load balancing of claim 12, wherein the at least one memory and the computer program code are configured to, with the at least one processor, cause the apparatus at least to send the second traffic steering command by sending a dedicated message or a broadcast message.

14. The apparatus for load balancing of claim 12, wherein the cellular radio comprises UTRAN or E-UTRAN.

15. The apparatus for load balancing of claim 12, wherein the non-cellular radio access comprises WLAN.

16. An apparatus for load balancing, comprising:
at least one processor; and
at least one memory including computer program code,
wherein the at least one memory and the computer program code are configured to, with the at least one processor, cause the apparatus at least to
receive a traffic steering command by a user equipment, wherein the traffic steering command contains an indication of a first rule to apply with respect to selection of radio access between cellular radio access and non-cellular radio access;
select between cellular radio access and non-cellular radio access based on the first rule; and
receive a second traffic steering command including an indication of a second rule to be applied by the user equipment with respect to selecting radio access between cellular radio access and non-cellular radio access,
wherein the second rule instructs the user equipment to go or to stay with cellular radio access, or instruct the user equipment to go to or stay with non-cellular radio access,
wherein the non-cellular radio access comprises wireless local area network (WLAN) access networks,
wherein the second traffic steering command further includes a plurality of lists that list the WLAN access networks based on at least one of a service set identifier (SSID), a basic service set identifier (BSSID), and a homogeneous extended service set identifier (HESSID) for which the rules are applicable,
wherein the plurality of lists includes a first list for an operator's own WLAN access networks, and a second list for a partner's WLAN access networks, and
wherein the user equipment is not configured to use access network discovery and selection function (ANDSF MO) before receiving the first rule.

17. A computer program for load balancing, embodied on a non-transitory computer readable medium, the computer program, when executed by a processor, causes the processor to:
send a traffic steering command to a user equipment, wherein the traffic steering command contains an indication of a first rule to be applied by the user equipment with respect to selecting radio access between cellular radio access and non-cellular radio access;
evaluating which rule to apply; and
send a second traffic steering command to the user equipment based on the evaluating, wherein the second traffic steering command contains an indication of a second rule to be applied by the user equipment with respect to selecting radio access between cellular radio access and non-cellular radio access, wherein the second rule instructs the user equipment to go or to stay with cellular radio access, or instruct the user equipment to go to or stay with non-cellular radio access, wherein the non-cellular radio access comprises wireless local area network (WLAN) access networks, wherein the second traffic steering command further includes a plurality of lists that list the WLAN access networks based on at least one of a service set identifier (SSID), a basic service set identifier (BSSID), and a homogeneous extended service set identifier (HESSID) for which the rules are applicable, and wherein the plurality of lists includes a first list for an operator's own WLAN access networks, and a second list for a partner's WLAN access networks, and wherein the user equipment is not using access network discovery and selection function (ANDSF MO) before receiving the first rule.

18. The computer program for load balancing of claim 17, wherein sending the second traffic steering command comprises sending a dedicated message or a broadcast message.

19. The computer program for load balancing of claim 17, wherein the cellular radio access comprises UTRAN or E-UTRAN.

20. The computer program for load balancing of claim 17, wherein the non-cellular radio access comprises WLAN.

21. A computer program for load balancing, embodied on a non-transitory computer readable medium, the computer program, when executed by a processor, causes the processor to:

receive a traffic steering command by a user equipment, wherein the traffic steering command contains an indication of a first rule to apply with respect to selection of radio access between cellular radio access and non-cellular radio access;

select between cellular radio access and non-cellular radio access based on the first rule; and receive a second traffic steering command including an indication of a second rule to be applied by the user equipment with respect to selecting radio access between cellular radio access and non-cellular radio access, wherein the second rule instructs the user equipment to go or to stay with cellular radio access, or instruct the user equipment to go to or stay with non-cellular radio access, wherein the non-cellular radio access comprises wireless local area network (WLAN) access networks, wherein the second traffic steering command further includes a plurality of lists that list the WLAN access networks based on at least one of a service set identifier (SSID), a basic service set identifier (BSSID), and a homogeneous extended service set identifier (HESSID) for which the rules are applicable, wherein the plurality of lists includes a first list for an operator's own WLAN access networks, and a second list for a partner's WLAN access networks, and wherein the user equipment is not using access network discovery and selection function (ANDSF MO) before receiving the first rule.

* * * * *